United States Patent [19]

Bayer et al.

[11] 4,312,546
[45] Jan. 26, 1982

[54] JOURNAL BEARING FOR HIGH-SPEED TUBULAR SHAFT

[75] Inventors: Oswald Bayer, Aidhausen; Werner Heinz, Obbach; Georg Rudloff, Bergrheinfeld, all of Fed. Rep. of Germany

[73] Assignee: FAG Kugelfischer Georg Schäfer & Co., Schweinfurt, Fed. Rep. of Germany

[21] Appl. No.: 90,986

[22] Filed: Nov. 5, 1979

[30] Foreign Application Priority Data

Nov. 8, 1978 [DE] Fed. Rep. of Germany ....... 2848778

[51] Int. Cl.³ .................. F16C 19/26; F16C 33/46; F16C 33/58; F16C 33/66
[52] U.S. Cl. .................................. 308/187; 308/216; 308/217; 308/236
[58] Field of Search .................... 308/187, 201, 207 R, 308/216, 217, 236

[56] References Cited

U.S. PATENT DOCUMENTS

| 3,166,363 | 1/1965 | Kay | 308/207 R |
| 3,193,338 | 7/1965 | Weidmann | 308/216 |
| 3,276,828 | 10/1966 | Mansfield | 308/236 |
| 3,450,449 | 6/1969 | Sibley et al. | 308/187 |
| 3,497,274 | 2/1970 | Yardley | 308/236 |
| 4,167,297 | 9/1979 | Cheesman | 308/216 |

FOREIGN PATENT DOCUMENTS 745175 5/1933 France .................. 308/207 R

Primary Examiner—Richard R. Stearns
Attorney, Agent, or Firm—Karl F. Ross

[57] ABSTRACT

A rapidly rotating shaft for a wire-rope-stranding machine or the like, comprising a plurality of tubular sections interconnected by flanged coupling sleeves, has a journal bearing for each coupling sleeve whose inner race is unitary with that sleeve while its outer race is a ring closely surrounded by a cylindrical housing. The ring and the housing are provided with aligned bores for the introduction of lubricant; an annular cage between the two races, having a multiplicity of peripherally spaced pockets engaged by respective bearing rollers, is provided with apertures between these pockets facilitating the passage of the lubricant to the inner race.

5 Claims, 3 Drawing Figures

JOURNAL BEARING FOR HIGH-SPEED TUBULAR SHAFT

FIELD OF THE INVENTION

Our present invention relates to a rotary machine of the type having a hollow shaft which is driven at high speeds, e.g. for wire-rope-stranding purposes.

BACKGROUND OF THE INVENTION

Shafts of this nature, which have considerable length and a large diameter, are generally divided into a plurality of tubular sections with interposition of a coupling sleeve of substantially the same inner and outer diameters between any two adjoining sections. Similar sleeves, without coupling functions, may also be secured to the free ends of the outermost sections. Each sleeve is rotatably supported in a stationary cylindrical housing, coaxial therewith, by an individual journal bearing carrying a single set of rotary bodies—preferably short cylindrical rollers—along a narrow track between its inner an outer races.

The inner bearing race is conventionally formed by a ring which is press-fitted onto the respective coupling or terminal sleeve. A similar, larger ring is press-fitted into the associated housing to form the outer bearing race.

At the high operating speeds customarily used in such machines the inner bearing race is subjected to large centrifugal forces tending to detach if from its supporting sleeve, thereby impairing the performance of the journal bearing. Furthermore, the machining of the ring to have it fit precisely onto the outer sleeve surface is difficult and correspondingly expensive.

OBJECTS OF THE INVENTION

An object of the present invention, therefore, is to provide an improved journal-bearing assembly for such a hollow shaft which obviates the aforestated drawbacks and allows rapid rotation of the shaft.

Another object is to provide means in such an assembly for effectively lubricating the rotary bearing bodies in order to facilitate operation at even higher shaft speeds than heretofore possible.

SUMMARY OF THE INVENTION

In accordance with an important feature of our present invention, the inner race of each journal bearing is no longer constituted by a separate ring fitted onto a supporting sleeve but is formed as an integral circular ridge of that sleeve rising from an outer peripheral surface thereof. Thus, there is journaled in each housing a unitary annular member of relatively simple structure with a large moment of resistance enabling it to withstand high-speed rotation.

Pursuant to another feature of our invention, the stationary housing and its outer bearing race are provided with aligned bores for the introduction of lubricant onto the track of the rotary bodies. Conventionally, these bodies are held mutually separated by an annular cage which is solid except for a number of peripherally spaced pockets engaged by the rollers or balls. In accordance with out present invention, we provide the cage with apertures between its pockets enabling passage of the lubricant toward the inner race.

BRIEF DESCRIPTION OF THE DRAWING

The above and other features of our invention will now be described in detail with reference to the accompanying drawing in which.

SPECIFIC DESCRIPTION

Figure 1:
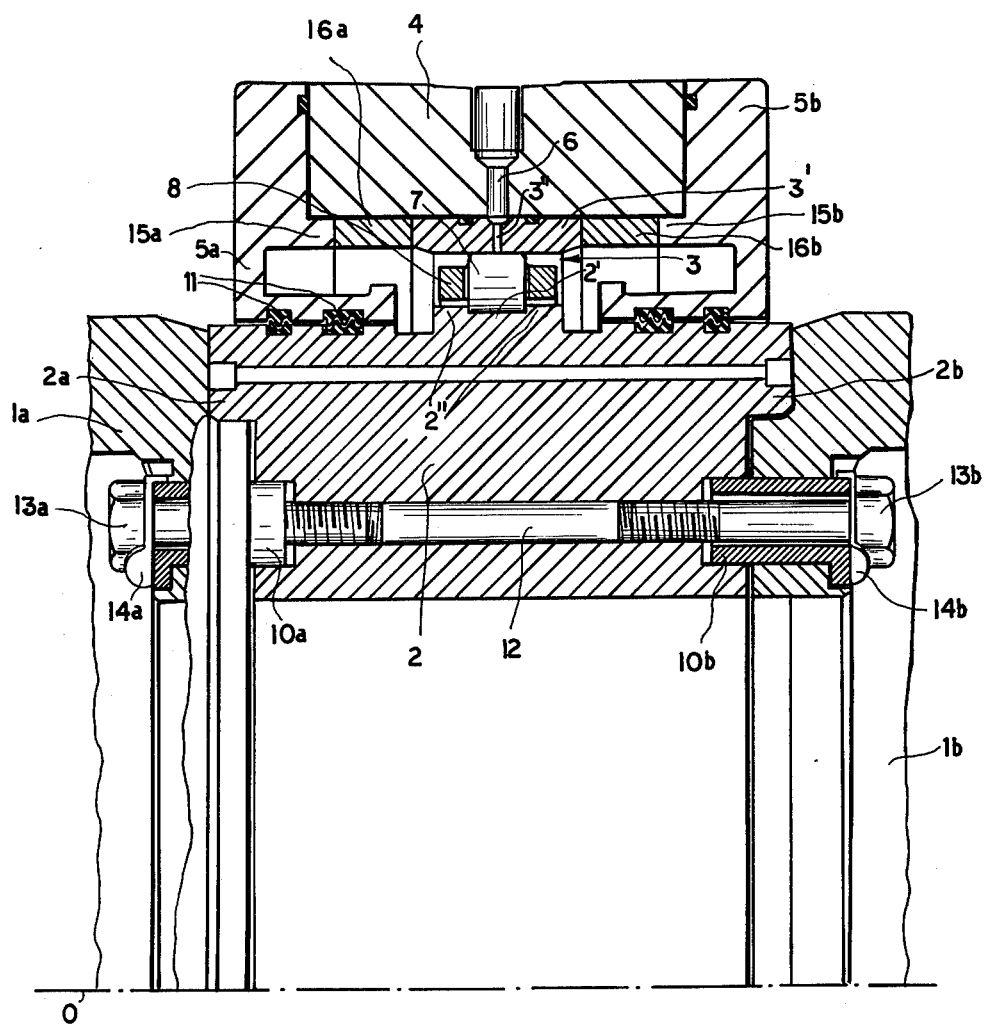
FIG. 1 is a fragmentary view of a high-speed hollow shaft for a wire-rope-stranding machine embodying our invention, with half of a coupling sleeve and an associated journal bearing shown in axial section.

In FIG. 1 we have shown part of two tubular shaft sections $1a$, $1b$, interconnected by a coupling sleeve 2 coaxial therewith. The sleeve has two end faces bounded by peripheral flanges $2a$ and $2b$ in contact with adjoining faces of shaft sections $1a$ and $1b$, respectively. A plurality of axially extending threaded bores 12 in sleeve 2 are engaged by screws $13a$, $13b$ which fasten the sleeve to the adjoining shaft sections. These screws are engaged by lock washers $14a$, $14b$ and pass through bushings $10a$, $10b$.

An integral peripheral ridge $2'$ of sleeve 2, formed with a pair of axially spaced peripheral ribs $2''$ and flanked by sleeve portions of lesser diameter substantially equal to that of the shaft sections $1a$, $1b$, constitutes an inner race for a journal bearing 3 whose outer race is formed by a ring $3'$ press-fitted into a stationary cylindrical housing 4 centered on shaft axis 0. Housing 4, whose axial width is less than that of sleeve 2, is flanked by a pair of annular disks $5a$, $5b$, secured thereto by means not shown, which form shoulders $15a$, $15b$ extending axially into the housing from opposite ends thereof and serving to hold the ring $3'$ centered through the intermediary of spacing rings $16a$, $16b$. Conventional labyrinth seals 11 between disks $5a$, $5b$ and coupling sleeve 2 prevent the outward excape of lubricant which is introduced through a pair of aligned bores $3''$ and 6 in ring $3'$ and housing 4, respectively. The two bearing races $2'$ and $3'$ are of approximately the same axial width which is substantially less than that of sleeve 2.

Figure 3:
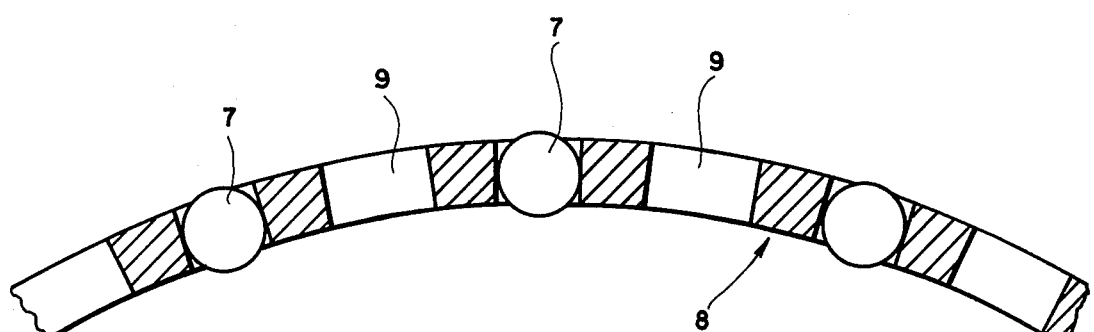
FIG. 3 is a sectional view taken on the line III-III of FIG. 2.
Figure 2:
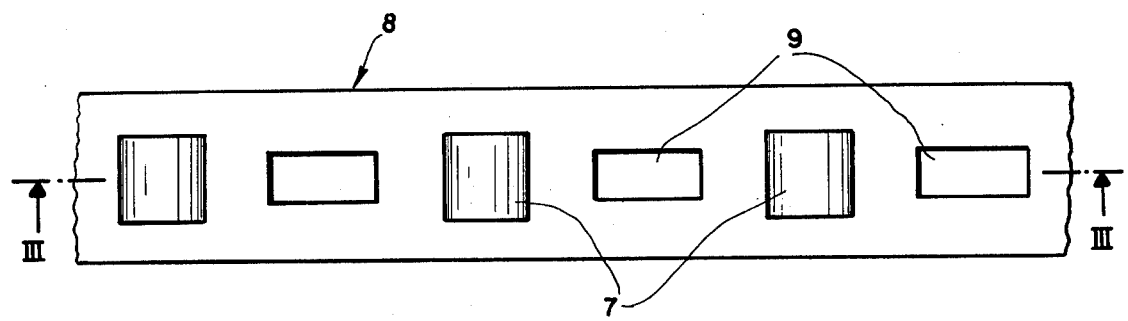
FIG. 2 is an enlarged fragmentary view of a bearing cage provided with lubricating apertures according to our invention.

An annular cage 8, more clearly illustrated in FIGS. 2 and 3, lies loose between races $2'$, $3'$ and has a multiplicity of peripherally spaced pockets receiving, in the usual manner, a set of rotary bodies 7 here shown as cylindrical rollers whose axial length approximately equals their diameter. Between these pockets the cage 8 is provided with apertures 9 which, as the cage rotates about its axis at a speed lower than that of the composite shaft $1a$, $1b$, 2, allow some of the lubricant to pass directly onto the track surface of inner race $1'$ while minor amounts reach that surface through entrainment by the cylindrical roller surfaces. The lubricant-admitting bores $3''$ and 6 may, of course, be duplicated at various locations along the periphery of ring $3'$ and housing 4.

It will be understood that housing 4 is part of a larger structure, not further illustrated, comprising additional housings for the support of the requisite number of shaft sections via other bearing assemblies preferably similar to that shown in the drawing.

We claim:

1. In a rotary machine wherein a hollow shaft adapted to be driven at high speed comprises a plurality of tubular sections, any two adjoining sections being interconnected by a coupling sleeve coaxial therewith, each coupling sleeve being rotatably supported in an associated cylindrical housing by a journal bearing including an inner race on said coupling sleeve, an outer race tightly fitted into said housing and a set of rotary bodies between said races, the improvement wherein said inner race is an integral circular ridge of said coupling sleeve rising from an outer peripheral surface thereof, said housing being flanked by a pair of annular disks with shoulders extending axially into said housing from opposite ends thereof, said outer race being held in position by said shoulders.

2. The improvement defined in claim 1 wherein said ridge is provided with a pair of axially spaced annular ribs, said rotary bodies being rollers guided between said ribs.

3. The improvement defined in claim 1 wherein said housing and said outer race are provided with aligned bores for the introduction of a lubricant.

4. The improvement defined in claim 3, further comprising an annular cage between said races having peripherally spaced pockets engaged by said rotary bodies, said cage being provided with apertures between said pockets enabling passage of said lubricant toward said inner race.

5. The improvement defined in claim 1, 2, 3 or 4 wherein said ridge is disposed between smaller-diameter portions of said sleeve, each of said ridges being of substantially lesser axial width than said housing and said sleeve.

* * * * *